(12) United States Patent
Tabata (10) Patent No.: US 7,653,444 B2
(45) Date of Patent: Jan. 26, 2010

(54) ELECTRONIC DEVICE AND DATA STORAGE MEDIUM

(75) Inventor: Fujio Tabata, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 721 days.

(21) Appl. No.: 11/160,389

(22) Filed: Jun. 22, 2005

(65) Prior Publication Data

US 2007/0010980 A1   Jan. 11, 2007

(51) Int. Cl.
   *G05B 13/02*   (2006.01)
(52) U.S. Cl. .......................... 700/20; 380/277; 700/19; 700/29; 710/8; 710/10; 710/14; 711/103; 717/170
(58) Field of Classification Search ................. 380/277; 700/19, 20, 29; 710/8, 10, 14; 711/103; 717/170
   See application file for complete search history.

(56) References Cited

U.S. PATENT DOCUMENTS 6,879,206 B2 * 4/2005 Mayer et al. ................. 327/525

2002/0029314 A1 * 3/2002 Minamizawa et al. ........ 711/103
2004/0207864 A1 * 10/2004 Combs et al. ............... 358/1.13

FOREIGN PATENT DOCUMENTS

| JP | 06-149550 A | 5/1994 |
| JP | A-H06-149550 | 5/1994 |
| JP | A-H07-46361 | 2/1995 |
| JP | 2002-073440 A | 3/2002 |

* cited by examiner

*Primary Examiner*—Kidest Bahta
*Assistant Examiner*—Carlos Ortiz Rodriguez
(74) *Attorney, Agent, or Firm*—Global IP Counselors, LLP (57) ABSTRACT

An electronic device which has a plurality of hardware which function as a predetermined model in accordance with model dependent data is disclosed which prevents easy modification of the model dependent data. An image forming device includes a plurality of control circuit boards, a plurality of memory units, and a main circuit board. The plurality of control circuit boards each control the operation of designated hardware. The plurality of memory units are readable and writable, and are each arranged in a plurality of locations which include the plurality of control circuit boards. The main circuit board writes the model dependent data to at least one of the plurality of memory units, reads the model dependent data upon startup, and identifies the model.

2 Claims, 9 Drawing Sheets

ELECTRONIC DEVICE AND DATA STORAGE MEDIUM

BACKGROUND OF THE INVENTION

1. Field of the Invention

The present invention relates to an electronic device, and particularly to an electronic device which has a plurality of hardware which operate in accordance with one or more control programs, the electronic device operating as a predetermined model in accordance with model dependent data which differs for each model of electronic device.

In addition, the present invention relates to an electronic device which has a plurality of hardware which operate in accordance with one or more control programs.

Furthermore, the present invention relates to an data storage medium.

In addition, the present invention relates to an electronic device which has hardware which uses a plurality of models in common and which can operate as a predetermined model in accordance with model data which is unique for each model.

2. Background Information

Electronic devices which comprise a plurality of hardware, a control circuit board for controlling the operation of the hardware, memory which is located on the control circuit board and which stores a predetermined control program, and a controller which executes the control program, are now in common use.

These electronic devices are for example image forming devices such as copiers, and may contain an image forming unit, a photosensitive drum, and a charged coupled device (CCD) or the like, and are constructed so as to collaborate and operate by execution of a control program.

With these conventional types of image forming devices, different models of hardware are used in common, and technology is already known for causing identical hardware to function as different models by means of model dependent data. Model dependent data includes a control program which is common for each model, and data or the like which differs for each model.

Furthermore, with this type of image forming device, it has already been proposed to store image dependent data for a plurality of models in the memory of one device, and to allow this data to be appropriately selected (for instance, refer to Japanese Laid Open Patent Application No. H6-149550). With this device, a change to a different model can easily be selected, and thus the task of updating a control program and the model dependent data in conjunction with a standard model change can be simplified, and errors which may occur during this operation can be prevented.

However, if the control program or the model dependent data is overwritten with unanticipated content by unreliable users and dealers, the setup for other data and hardware which was to have been modified by this change will remain in its original condition and problems will occur. As a result, there is a possibility that the image quality may be degraded, or identification of the cause of an equipment malfunction or the like may be difficult.

Moreover, when a control program or the like of a low-grade model is overwritten as that of a high-grade model and sold at a low price, the manufacture of the device and the authorized dealer will not be able to receive the appropriate profits.

Note that technology has already been proposed for a conventional image forming device which connects to an external device and acquires the control program of that external device from the external device in order to acquire the functions had by that external device (for instance, refer to Japanese Laid Open Patent Application No. H7-46361).

With an image forming device having hardware which is common between models as described above, the selling agent or the authorized dealer or the like will try to have different models of equipment in stock, even if the equipment has identical hardware, so that they can meet the various needs of each customer, and therefore the inventory quantities thereof may increase.

However, the technology proposed in Japanese Laid Open Patent Application No. H7-46361 is nothing more than acquiring an external device which has certain functions in order to realize these functions which could not be had by the image forming device alone, and therefore is not a means of resolving this problem.

An object of the present invention is to prevent model dependent data from being easily changed in electronic devices which have a plurality of hardware which function as predetermined models in accordance with the model dependent data.

Another object of the present invention is to prevent the model dependent data from easily being changed in electronic devices which have hardware which identifies the model and functions as a predetermined model.

Yet another object of the present invention is to resolve inventory problems arising from having multiple models of equipment for electronic devices which have hardware which is common between different models.

This invention addresses these objects well as other objects, which will become apparent to those skilled in the art from this disclosure.

SUMMARY OF THE INVENTION

The electronic device according to a first aspect of the present invention includes a plurality of hardware which operate in accordance with one or more control programs, the plurality of hardware collectively operating as a predetermined model of the electronic device in accordance with model dependent data which differs for each model thereof; one or more hardware controllers which respectively control the operation of the plurality of hardware; a plurality of readable and writable memory units respectively disposed in a plurality of locations which include the one or more hardware controllers; and a model identification controller which writes model dependent data to at least one of the plurality of memory units, and reads the model dependent data upon startup in order to identify the model of the electronic device.

With this device, the model dependent data is written to one of the plurality of memory units which are dispersed to a plurality of locations, so the location where the model dependent data is stored will be difficult to determine by a party other than the manufacturer or the like of the device, and changes will be difficult. Therefore, this device can prevent the model dependent data from easily being changed by other parties.

Note that in the first to fifth aspects of the present invention, the model dependent data refers to the data necessary for each hardware to function as the predetermined model and which is read in order to identify the predetermined model, and when the electronic device is an image forming device for example, may include data such as the transport speed of the paper, the charge potential, and the interval between supplied paper, or the like.

Furthermore, the hardware may include peripheral devices for the photosensitive drum, engines including transport mechanisms or the like, CCD, and the photosensitive drum or the like. The one or more hardware controllers may specifically be engine circuit boards, CCD circuit boards, and drum circuit boards or the like.

The electronic device according to the second aspect of the present invention is the electronic device of the first aspect, wherein each memory device is an EEPROM (Electronically Erasable and Programmable ROM).

With this device, EEPROM is used for the memory units so the cost will be low and the model dependent data or the like can be overwritten innumerable times.

The electronic device according to the third aspect of the present invention is the electronic device of the first aspect, wherein the memory units disposed on the one or more hardware controllers store the one or more control programs; each memory unit has an empty region; and the model dependent data is written in the empty regions.

With this device, memory which is originally attached to control circuit boards used as hardware controllers and which stores one or more control programs may be used as the memory units, and can use designated available space which is generally present with this type of memory as the storage location for the model dependent data, and therefore additional costs can be controlled.

Note that the memory units are integrated with the one or more hardware controllers, such as memory which is mounted on a controller circuit board.

The electronic device according to the fourth aspect of the present invention is the electronic device of the first aspect, wherein the model identification controller distributes and writes the model dependent data to the memory units.

With this device, the model dependent data is dispersed to a plurality of locations, so the storage location cannot easily be determined by a party other than the manufacturer or the like of the device and changes to the model dependent data can more positively be prevented.

Note that the form of the dispersion includes distributing and writing the data to a plurality of memory, such as the memory unit on the engine control circuit board and memory unit on the CCD circuit board, as will be described later, as well as distributing and writing the data to a single memory unit.

The electronic device according to the fifth aspect of the present invention is the electronic device of the first aspect, wherein the plurality of hardware include an image forming unit which forms images on transfer media.

This is to prevent the model dependent data from easily being changed when the electronic device is an image forming device in particular.

The electronic device according to a sixth aspect of the present invention is an electronic device having a plurality of hardware which operate in accordance with one or more control programs, the plurality of hardware collectively operating as a predetermined model of the electronic device in accordance with model dependent data which differs for each model of electronic device; a plurality of memory units which store the one or more control programs, and a boot program which is executed upon startup and which includes the model dependent data; a model identification controller which reads the model dependent data and identifies the model of the electronic device; and one or more hardware controllers which control the hardware as the model of the electronic device identified by the model identification controller in accordance with the one or more control programs.

With this electronic device, the model dependent data is included in a boot program which is essentially unchangeable after the design and production stage, and is difficult to be changed by a party other than the manufacturer or the like of the device, thus preventing other parties from the easily changing the model dependent data and suppressing the occurrence of unanticipated problems or the like.

Note that in the sixth to ninth aspects of the present invention, the model dependent data refers to data which identifies the model of the electronic device by being read, and is data necessary for the hardware to function collectively as a predetermined model of the electronic device. For instance, when the electronic device is an image forming device, the data may include the number of pages printed per unit of time, paper transport speed, charge potential, and the interval between supplied papers or the like.

Furthermore, the hardware may be peripheral devices for the photosensitive drum, engines which include a transport mechanism or the like, CCD, or a photosensitive drum or the like. The one or more hardware controllers may specifically be an engine circuit board, a CCD circuit board, or a drum circuit board or the like. Furthermore, "upon startup" includes the time from when the power to the electronic device is turned on until a predetermined start up function has been performed.

The electronic device according to a seventh aspect of the present invention is the electronic device of the first aspect, wherein the memory units store one or more control programs for a plurality of mutually different models of the electronic device; the one or more hardware controllers select and read the one or more control programs for the model of the electronic device identified by the model identification controller; the electronic device further comprises a model selecting unit which selects one model from a plurality of models; and the one or more hardware controllers execute the one or more control programs for a model if the model identified by the model identification controller and the model selected by the model selecting unit are matching.

This device will function as a certain model only if the model identified by the model dependent data of the boot program matches the model selected by the model selecting unit. In the event that the model dependent data has been modified, the device will not function as the modified model, and therefore unanticipated problems can be prevented and unforeseen loss of profits for the manufacturer or the like of the device can be prevented.

The electronic device according to an eighth aspect of the present invention is the electronic device of the seventh aspect, wherein the one or more hardware controllers execute the one or more control programs for the lowest level model if the model identified by the model identification controller and the model selected by the model selecting unit do not match.

With this device, in the event that the model dependent data has been modified and the model selected by the model selecting unit is determined do not match, the device will function as the least expensive lowest level model in order to prevent other parties from obtaining profit from the improper improvements.

The electronic device according to a ninth aspect of the present invention is the electronic device of the sixth aspect, wherein the hardware includes an image forming unit which creates images on transfer media.

This is to prevent the model dependent data from easily being changed when the electronic device is an image forming device in particular.

The electronic device according to a tenth aspect of the present invention is an electronic device which has a plurality of hardware which function in accordance with a control program, comprising a multilayer circuit board, an integrated circuit board (hereinafter IC), a model identification controller, and one or more hardware controllers. The multilayer circuit board as a plurality of circuit layers. The IC is a ball grid array type (hereinafter BGA) circuit which is arranged on the multilayer circuit board and has a plurality of general ports which include a model identification port which is connected to one of the plurality of circuit layers. The model identification controller identifies a model based on a low level or a high level of the model identification port. The one or more hardware controllers control the hardware as the model identified by the model identification controller in accordance with the one or more control programs.

With this electronic device, identification of the model is performed by whether the model identification port of the BGA type IC is in a high level or a low level, but once removed from a circuit board, the BGA type IC is extremely difficult to re-attach to the circuit board with the same connection conditions as prior to removal, so changing the connection status of the model identification port is essentially impossible. Therefore, another party can be prevented from easily modifying the level relating to the model identification, and thereby the occurrence of unanticipated problems or the like can be suppressed.

Note that in the tenth to fifteenth aspects of the present invention, the hardware may be peripheral devices for the photosensitive drum, engines which include a transport mechanism or the like, CCD, or a photosensitive drum or the like. The one or more hardware controllers may specifically be an engine circuit board, a CCD circuit board, or a drum circuit board or the like. Furthermore, "upon start up" includes the time from when the power to the electronic device is turned on until a predetermined start up function has been performed.

The electronic device according to an eleventh aspect of the present invention is the electronic device of the tenth aspect, wherein the circuit layer of the multilayer circuit board has four or more layers including a ground layer (hereinafter GND layer) and a power source layer. Furthermore, the IC model identification port is connected to at least one of either the GND layer or the power source layer.

With this device, specifically, the model identification port will be in a low level if connected to the GND layer and will be in a high level if connected to the power source layer, and is able to identify the model with this type of simple structure.

The electronic device of an twentieth aspect is an electronic device having hardware that is both commonly used in a plurality of models of the electronic device and which can be collectively operated as a predetermined model of the electronic device in accordance with model information that is unique to each model of the electronic device; an information read controller which is capable of reading the model information from the data storage medium of the sixteenth aspect; a model identification controller which is capable of identifying the model of the electronic device based on the model information which is read from the information read controller; and one or more hardware controllers which control the hardware as the model of the electronic device identified by the model identification controller in accordance with one or more control programs.

With this device, model identification can be performed by using the change in the voltage input to the analog port of an IC by the ratio (split voltage ratio) between the resistance values of two resistors, but because chip resistors are used as the two resistors, determining which chip resistors have which resistance value will be difficult for a third party, so modification will be difficult. Therefore, with this device, other parties can be prevented from easily changing the levels relating to model identification, and thereby the occurrence of unanticipated problems can be suppressed.

Note that as used herein, an IC includes a CPU which is able to input an analog signal.

The electronic device according to a thirteenth aspect of the present invention is the electronic device of the twelfth aspect, wherein at least one of the first or second chip resistors does not show a resistance value on the surface thereof.

Very small chip resistors, such as those with a 1005 size or a 0603 size, normally do not have the resistance value shown on the surface. If at least one of this type of chip resistor is used, the split voltage ratio will be unknown to a third party, so the voltage change which is input to the analog port will be difficult to grasp. Thus, changes by another party to the level relating to model identification can more positively be prevented.

The electronic device according to a fourteenth embodiment is an electronic device which has a plurality of hardware which function in accordance with one or more control programs, and which collectively function as a predetermined model of the electronic device in accordance with model dependent data which differs for each model of electronic device, comprising a program memory unit, a model identification controller, and one or more hardware controllers. The program memory unit is established in the masked region of a mask CPU and stores the one or more control programs and the model dependent data. The model identification controller reads the model dependent data stored in the program memory unit and identifies the model. The one or more hardware controllers control the hardware as the model identified by the model identification controller in accordance with the one or more control programs.

With this device, the model dependent data is stored in the masked region of a mask CPU, so changes by a third-party are not possible. Furthermore, easily changing the model dependent data by another party can be prevented, and thereby the occurrence of unanticipated problems or the like can be suppressed.

Note that in the fourteenth aspect of the present invention, the model dependent data refers to data which identifies the model by being read and which is necessary for the hardware to collectively function as a predetermined model. For example, when the electronic device is an image forming device, this data may include such data as the number of pages printed per unit time, the transport speed of the paper, the charge potential, and the interval between the supply paper or the like. Furthermore, the masked region refers to a region such as the program memory unit which will be described later, where data or the program or the like is burned in and cannot be changed.

The electronic device according to a fifteenth aspect of the present invention is the electronic device of the tenth aspect, wherein the hardware is an electronic device shown in any one of the first to fifth aspects, including image forming devices which create an image on a transfer material.

This is to prevent the model dependent data from easily being changed when the electronic device is an image forming device in particular.

The data storage medium according to a sixteenth aspect of the present invention comprises a medium body and a memory unit. The memory unit stores model information that can be provided to an electronic device, the electronic device has hardware that is both commonly used in a plurality of models of the electronic device and which can be operated as a predetermined model of the electronic device in accordance with model information that is unique to each model, and the model information can cause the predetermined model of the electronic device to operate as a different model.

The medium contains model information which can be changed for different models of hardware that are is common to a certain model of electronic device, and therefore the information can be changed for different models of the electronic device by providing and updating the content to the model of the electronic device which is subject to modification.

Therefore, electronic devices which contain hardware which is common for different models can be changed to different models at any time using the data storage medium even if only one of the models are in inventory, and therefore having a plurality of each device in inventory is not necessary.

Furthermore, if a user desires a higher level model, the information memory media which contains that model information can be purchased and easily updated, and therefore the equipment itself will not have to be replaced, and this has cost advantages.

Note that in the sixteenth to twentieth aspects of the present invention, the data storage medium may be, for instance, a circuit board which contains a semiconductor memory which stores the model information. The hardware may include peripheral devices for a photosensitive drum, engines including transport mechanisms or the like, CCD, or the photosensitive drum or the like. The model information may include, for instance, page count data (number of pages which can be printed in a unit of time) for situations in which the electronic device is an image forming device, as well as control conditions or the like for the hardware which accompanies the electronic device.

The data storage medium according to a seventeenth aspect of the present invention is the electronic device of the sixteenth aspect, wherein the model information stored in the memory unit cannot be read after the model information is provided to the electronic device once.

With this medium, once the model information has been retrieved by an external unit, subsequent reading is not possible, so improper copying by other parties can be prevented and the manufacturers or the like of the electronic device can be ensured a fair profit.

Note that situations in which model information is provided to an electronic device includes a situation in which the information is read by the electronic device itself, and a situation in which the information is read by another device such as a computer and then sent to the electronic device.

The data storage medium according to a eighteenth aspect of the present invention is the electronic device of the seventeenth aspect, wherein the model information which is stored in the memory unit has address information in the memory unit and the addressed information is set to 0 after being provided to the electronic device.

With this medium, if the model information is retrieved by an external unit, the address information in the memory unit will be erased, so subsequent reading will not be possible.

The data storage medium according to a nineteenth aspect of the present invention is the electronic device of the sixteenth aspect, wherein the model information which is stored in the memory unit is for a higher level model than the model of the electronic device provided.

When a higher model electronic device is newly released to the market, if the model and hardware owned by the user are common, a simple model change will be possible by using the data storage medium to update the model information of the current electronic device without purchasing a new device of a higher model.

The electronic device according to a twentieth aspect of the present invention is an electronic device having hardware that is both commonly used in a plurality of models of the electronic device and which can be collectively operated as a predetermined model of the electronic device in accordance with model information that is unique to each model of the electronic device; an information read controller which is capable of reading the model information from the data storage medium according to the sixteenth aspect of the present invention; a model identification controller which is capable of identifying the model of the electronic device based on the model information which is read from the information read controller; and one or more hardware controllers which control the hardware as the model of the electronic device identified by the model identification controller in accordance with one or more control programs.

This electronic device can be converted to another model having the same hardware by using the data storage medium of the present invention, and therefore, a dealer which handles these devices can provide for the various needs of the users without holding a plurality of models in inventory, only one model type needs to be held in inventory, and inventory problems can thereby be resolved.

Furthermore, this electronic device can later be converted to another model using the data storage medium, so only one model of device needs to be manufactured, and therefore converting the production line for each model will not be necessary.

Note that the format for reading by the information read controller includes not only directly reading the model information from the data storage medium, but also indirectly reading the model information by means of a computer or a server or the like.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

BRIEF DESCRIPTION OF THE PREFERRED EMBODIMENTS

First Embodiment

Structure of Image Forming Device

Figure 1:
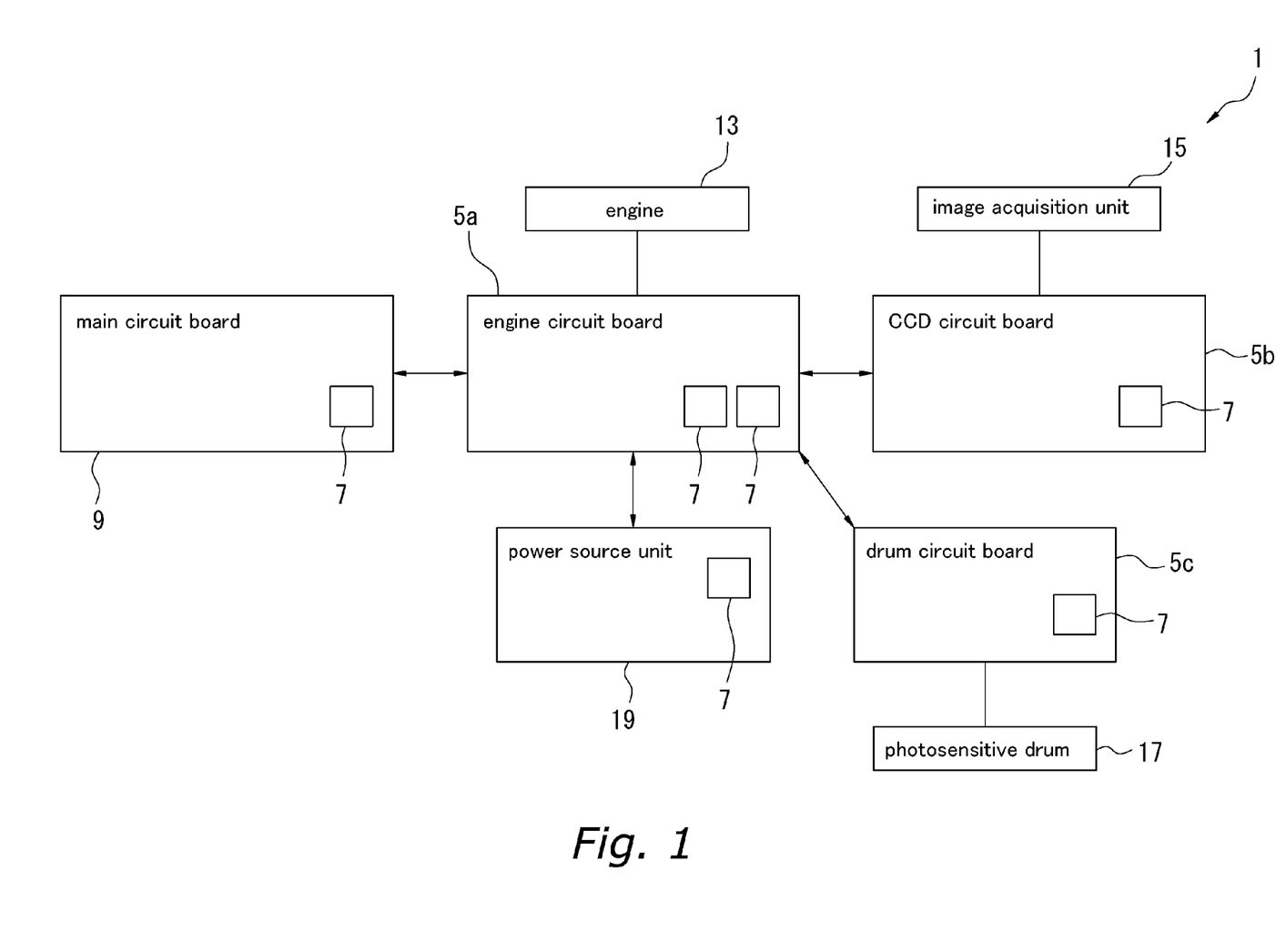
FIG. 1 is a block diagram schematically showing an image forming device which uses a first embodiment of the present invention.

FIG. 1 shows an image forming device which uses a first embodiment of the present invention.

This image forming device 1 is a compound device which functions as a copier, printer, fax machine, and scanner, and is comprised of a plurality of input/output units (hardware), three control circuit boards (hardware controllers) 5a, 5b, 5c, six memory units 7, and a main circuit board (model identification controller) 9.

Each of the input/output units operate in accordance with a control program (described below), and together operate as a predetermined model of the image forming device 1 in accordance with the model dependent data. The input/output units include an engine 13, an image acquisition unit 15, a photosensitive drum 17, and a power source unit 19.

The engine 13 comprises a paper supply unit (not shown in the drawings), a transport mechanism, an image forming unit, a control panel, and the like. The paper supply unit is for supplying paper from a paper supply cassette or a manual insert tray. The transport mechanism is for transporting the supplied paper to the image forming unit and then further downstream thereof. The image forming unit comprises an exposure unit, a charging unit, a developing unit, and a transfer unit all located near the photosensitive drum 17, and a fixing unit located downstream from the photosensitive drum 17. The control panel has a plurality of control keys and a display unit.

The image acquisition unit 15 is for acquiring image information for an original document on the document platen (not shown in the drawings), and comprises a CCD and an optical system (not shown in the drawings).

The photosensitive drum 17 is a cylindrical rotating body on which a toner image is formed on the surface thereof.

The power source 19 is for acquiring power from an external source, and is connected to the engine circuit board 5a.

The control circuit boards are specifically the engine circuit board 5a, the CCD circuit board 5b connected thereto, and the drum circuit board 5c, each of which has electronic components such as an IC for controlling the engine 13, image acquisition unit 15, or the photosensitive drum 17, respectively.

The memory units 7 include a total of six EEPROM which are located on each of the control circuit boards 5a-5c, the main circuit board 9, and the power source unit 19, with one EEPROM located at each except for the engine circuit board 5a, where two EEPROM are located. Each of the memory units 7 on the control circuit boards 5a-5c can store a control program which controls the operation of the input/output units.

Each of the memory units 7 has a fixed empty region, and model dependent data can be written to each of the empty regions. Furthermore, the memory units 7 can also record data such as the number of pages previously printed, and the rotation time of the photosensitive drum 17, in addition to the control program and the model dependent data.

The main circuit board 9 is for integrating and controlling the operation of the control circuit boards 5a-5c and the power source unit 19, and has a CPU which is connected to the engine circuit board 5a. This CPU reads the content of all of the memory units 7 upon start up after the power is turned on, and determines the model of the image forming device 1 by acquiring the model dependent data which is stored in one of the memory units 7. On the other hand, when the power source is turned off, the CPU temporarily clears the model dependent data in the memory units 7, and then writes the model dependent data to any one of the plurality of memory units 7. In this case, this CPU may randomly select and write to a memory unit 7, but for instance, it is also possible for the CPU to reference the value of the CPU clock and to write the model dependent data to the memory unit 7 which corresponds to this value. Furthermore, this CPU has an internal memory unit, and is able to recall which memory unit 7 the model dependent data was written to even after the power has been turned off.

Operation of the Image Forming Device

Next, the function of the image forming device 1 will be described.

With this image forming device 1, when the power is turned on and power is supplied to the main circuit board 9 from the power source unit 19, the content of each of the memory units 7 is read. At this time, the model of the image forming device 1 will be identified when the model dependent data which is stored in one of the memory units 7 is read by the CPU of the main circuit board 9. Furthermore, each of the controller circuit boards 5a-5c will control each of the input/output units unique to that model in accordance with the model data included in the model dependent data.

On the other hand, when the power is turned off, the CPU of the main circuit board 9 will delete the model dependent data from the memory units 7 where the model dependent data had been stored, will write the model dependent data to any one of the six memory units 7, and will record which memory unit 7 the image dependent data was written to in a memory region.

With the aforementioned image forming device 1, the model dependent data is written and stored to any one of the memory units 7 which are dispersed in a plurality of locations, so persons other than the manufacturer of the device 1 or an authorized dealer cannot easily determine where the model dependent data is stored, and thereby another party can be prevented from easily changing the model dependent data.

Modifications of the First Embodiment (a) With the first embodiment, the model dependent data may also be distributed and written to a plurality of memory units (such as one of the memory units of the engine circuit board and the memory unit of the CCD circuit board). In this case, the content of all of the memory units must be read when identifying the model, so even if the content of one of the memories is overwritten by someone, overwriting of all of the model dependent data can be prevented.

(b) The model dependent data may also be dispersed and written to different regions in one memory unit.

(c) With the first embodiment, the image forming device may be constructed such that if overwriting of the memory contents is detected at startup (for instance, the content of the initial setup is different), notification shall be made of that fact. Therefore, even in the event that the content of the model dependent data is overwritten, a prompt response will be possible.

Furthermore, for the case where the model dependent data is distributed and stored as shown in (a) or (b) above, the device may be structured to detect if the contents of the distributed data have been modified by mutually comparing the distributed data upon startup.

(d) Overwriting of the model dependent data by the model identification controller is not restricted to times when the power is off, and maybe performed any time after an initial read upon startup.

(e) The memory units 7 are not restricted to EEPROM, and other types of memory may also be used.

(f) The control program and the model dependent data may be stored in one of the memory units or a plurality of the memory units. It is also acceptable for other memory units to be provided and the data to be stored in the other units.

(g) The present invention is not restricted to image forming devices, and may be applied to other electronic devices which have a plurality of hardware which operate in accordance with one or more control programs and model dependent data, and other electronic devices may be applicable if a plurality of memory units are provided.

Second Embodiment

Structure of Image Forming Device

Figure 2:
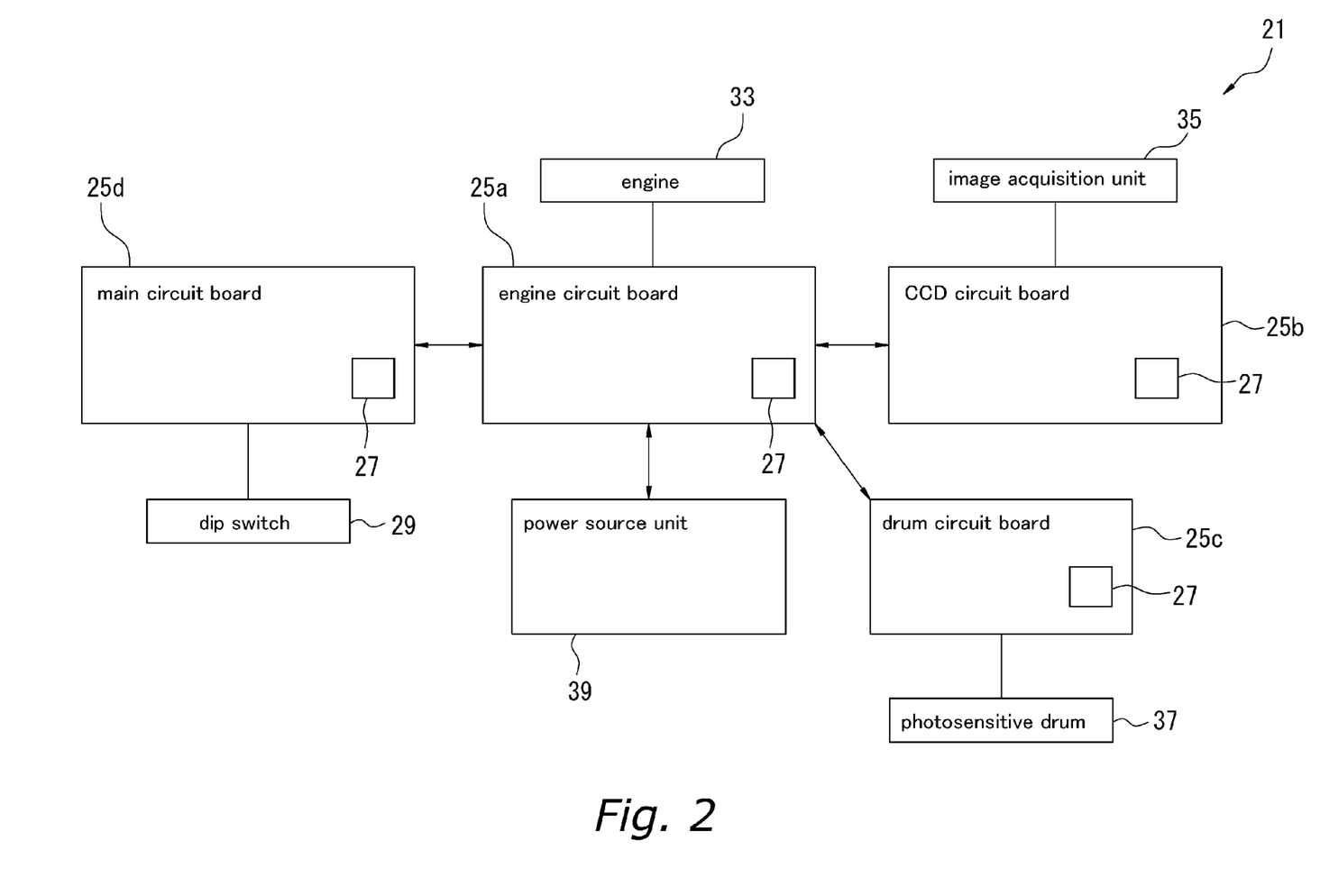
FIG. 2 is a block diagram schematically showing an image forming device which uses a second embodiment of the present invention.

FIG. 2 shows an image forming device 21 which uses a second embodiment of the present invention.

This image forming device 21 is a compound device which functions as a copier, printer, fax machine, and scanner, and is comprised of a plurality of input/output units (hardware), four control circuit boards (model identification controller, hardware controllers) 25a, 25b, 25c, 25d, memory units 27a, 27b, 27c, 27d that are arranged on each control circuit board 25a to 25d, and a dip switch 29.

Each input/output unit operates in accordance with a control program (described below), and together operate as a predetermined model of the image forming device 21 in accordance with the model dependent data for that model. Each input/output unit comprises an engine 33, an image acquisition unit 35, a photosensitive drum 37, and a power source unit 39.

The engine 33 comprises a paper supply unit (not shown in the drawings), a transport mechanism, an image forming unit, a control panel, and the like. The paper supply unit is for supplying paper from a paper supply cassette or a manual insert tray. The transport mechanism is for transporting the supplied paper to the image forming unit and then further downstream thereof. The imaging unit comprises an exposure unit, a charging unit, a developing unit, and a transfer unit all located near the photosensitive drum 37, and a fixing device located downstream from the photosensitive drum 37. The control panel has a plurality of control keys and a display unit.

The image acquisition unit 35 is for acquiring the image information for an original document on the document platen (not shown in the drawings), and comprises a CCD and an optical system (not shown in the drawings).

The photosensitive drum 37 is a cylindrical rotating body on which a toner image is formed on the surface thereof.

The power source 39 is for acquiring power from an external source, and is connected to the engine circuit board 25a.

The controller circuit boards 25a~25d are specifically an engine circuit board 25a, a CCD circuit board 25b connected thereto, a drum circuit board 25c, and a main circuit board 25d, each equipped with a CPU and memory units 27a~27d. The controller circuit boards 25a~25c comprise various types of electronic components such as ICs which control the operation of the engine units 33, the image acquisition unit 35, and the photosensitive drum 37. Furthermore, the main circuit board 25d is for integrating and controlling the operation of the control circuit boards 25a~25c and the power source unit 39.

After the power is turned on, the CPUs of the control circuit boards 25a~25d read one or more boot programs stored in the memory internal to the CPUs and/or stored in the memory units 27a~27d of the same control circuit boards, perform the predetermined startup functions, select a control program for the identified model of the image forming device 21 from amongst a plurality of control programs which are included in a common program, and read out and execute the control program.

At this time, the main circuit board 25d reads the model dependent data included with the one or more boot programs and identifies the model of the image forming device 21 (model identification function), compares the identified model with the model selected by the dip switch 29, and if both models match, instructs the other control circuit boards 25a~25c to read and execute the control program for that model (hardware control function). On the other hand, if the models do not match, an improper change to the model dependent data will be detected and the control circuit boards 25a~25c will be instructed to read and execute the control program of the lowest level model of the image forming device 21.

The memory units 27a~27d comprise RAM and ROM arranged on the control circuit boards 25a~25d. Each of the memory units 27a~27d store a boot program and a common program. A boot program is a program which is executed while starting up after the power is turned on. In particular, the boot program in the memory unit 27d on the main circuit board 25d includes the model dependent data.

The common program is a program that is used in a variety of different models of image forming devices which have common input/output units, and the common program includes a plurality of control programs for a plurality of models in order to control the operation of the input/output units.

The dip switch 29 is a switch for selecting one model from a plurality of models, and is connected to the main circuit board 25d. A model is selected with the dip switch 29 at the time that the device 21 is manufactured, but even after the device 21 is manufactured, a user or a service representative or the like can make changes using a predetermined operation.

Operation of Image Forming Device

Next, the function of the image forming device 21 will be described.

With this image forming device 21, when power is turned on and power is supplied to the control circuit boards 25a~25d, the boot program in each of the circuit boards 25a~25d will be executed and startup will be performed. Furthermore, in the main circuit board 25d, the model dependent data which is included in the boot program will be read and the model will be identified. In addition, the identified model will be compared to the model selected by the dip switch 29, and if the models match, the other control circuit boards 25a~25c will be instructed to read and execute the control program for that model. On the other hand, if the models do not match, an improper change to the model dependent data will be detected, and the control circuit boards 25a~25c will be instructed to read and execute the control program for the lowest level model.

With this type of image forming device 21, if one attempts to modify the model dependent data after the design and production stage, each board including the other programs will need to be exchanged, so modifications by a party other than the manufacturer or the like of the device is essentially impossible. Therefore, with this device 21, other parties are prevented from easily modifying the model dependent data and the occurrence of unanticipated problems or the like can be suppressed.

Modifications of the Second Embodiment (a) Other means such as a control panel operating key or a drum encoder for controlling the speed of the photosensitive drum may be used instead of the aforementioned dip switch as the model selecting unit.

(b) With the second embodiment, the image forming device may be constructed such that if overwriting of the model dependent data content in the boot program is detected at startup (for instance, the content of the initial setup is different), notification shall be made of that fact. Therefore, even in the event that the content of the model dependent data is overwritten, a prompt response will be possible.

(c) The present invention is not restricted to image forming devices, and may be applied to other electronic devices which have a plurality of hardware which function in accordance with a control program and model dependent data.

Third Embodiment

Figure 3:
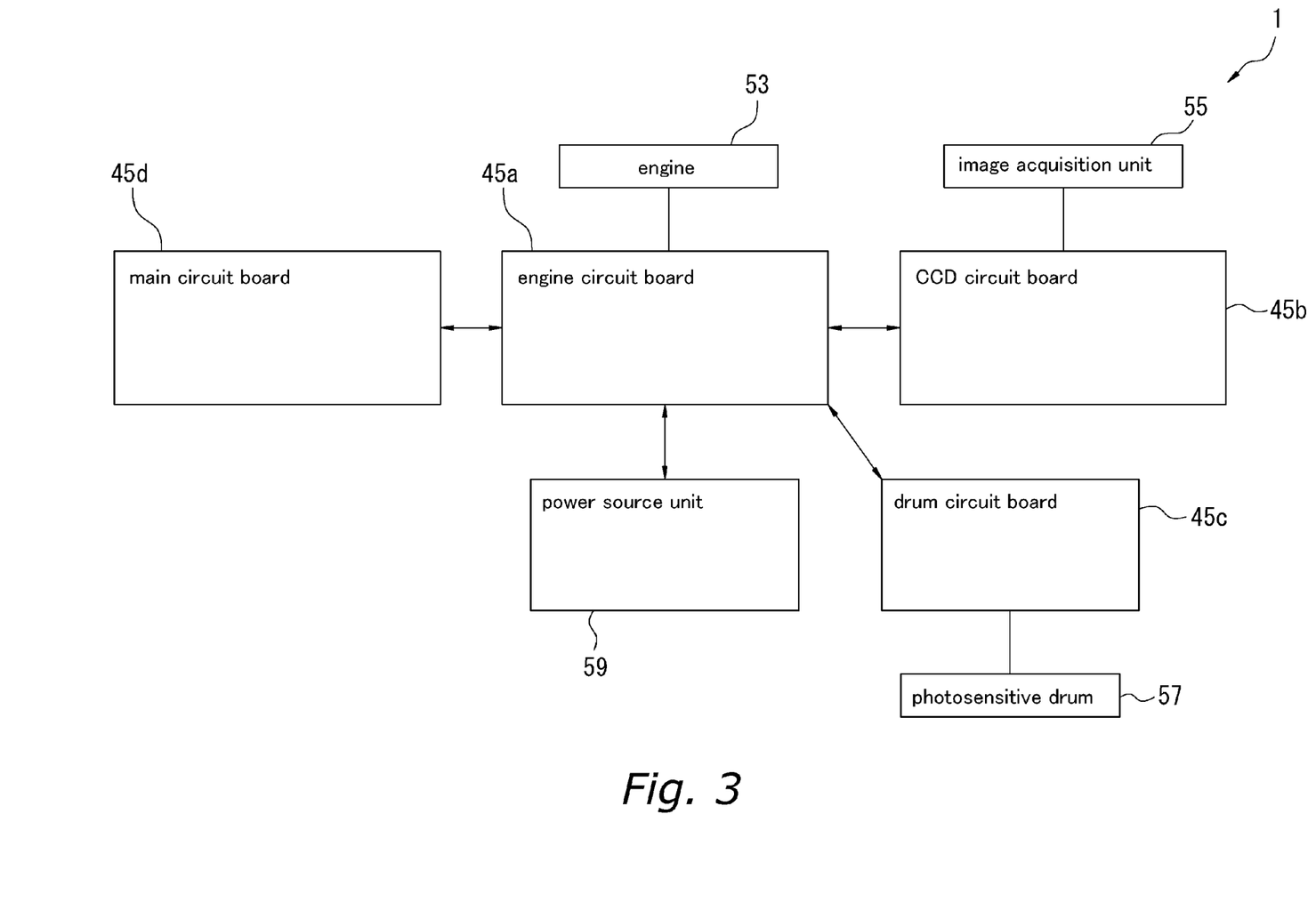
FIG. 3 is a block diagram schematically showing an image forming device which uses a third embodiment of the present invention.

An image forming device 41 which uses the third embodiment of the present invention is shown in FIG. 3.

This image forming device 41 is a compound device which functions as a copier, printer, fax machine, and scanner, and is comprised of a plurality of input/output units (hardware), and four control circuit boards (model identification controller, hardware controllers) 45a, 45b, 45c, 45d.

Each input/output unit operates in accordance with a control program (described below), and operates as a predetermined model in accordance with the model dependent data for each model. Each input/output unit comprises an engine 53, an image acquisition unit 55, a photosensitive drum 57, and a power source unit 59.

The engine 53 comprises a paper supply unit (not shown in the drawings), a transport mechanism, an image forming unit, a control panel, and the like. The paper supply unit is for supplying paper from a paper supply cassette or a manual insert tray. The transport mechanism is for transporting the supplied paper to the image forming unit and then further downstream thereof. The image forming unit comprises an exposure unit, a charging unit, a developing unit, and a transfer unit all located near the photosensitive drum 57, and a fixing unit located downstream from the photosensitive drum 57. The control panel has a plurality of control keys and a display unit.

The image acquisition unit 55 is for acquiring the image information for an original document on the document platen (not shown in the drawings), and comprises a CCD and an optical system (not shown in the drawings).

The photosensitive drum 57 is a cylindrical rotating body on which a toner image is formed on the surface thereof.

The power source 59 is for acquiring power from an external source, and is connected to the engine circuit board 45a.

The controller circuit boards 45a~45d are specifically an engine circuit board 45a, a CCD circuit board 45b connected thereto, a drum circuit board 45c, and a main circuit board 45d, each equipped with electronic components such as a CPU, memory units, an IC, or the like (not shown in the drawings).

Each of the memory units 7 comprises RAM and ROM arranged on the control circuit boards 45a~45d, and store a common program which is common to each circuit board.

The common program is a program which is used in common by a plurality of models which have common input/output units, and a plurality of control program for a plurality of models which control the operation of the input/output units are included in the common program.

The CPU of the control circuit boards 45a~45c selects, reads, and executes the control programs suitable for the model which is identified by the main circuit board 45d from the plurality of control programs which are included in the common program in the memory units 7 of the identical circuit boards.

Figure 4:
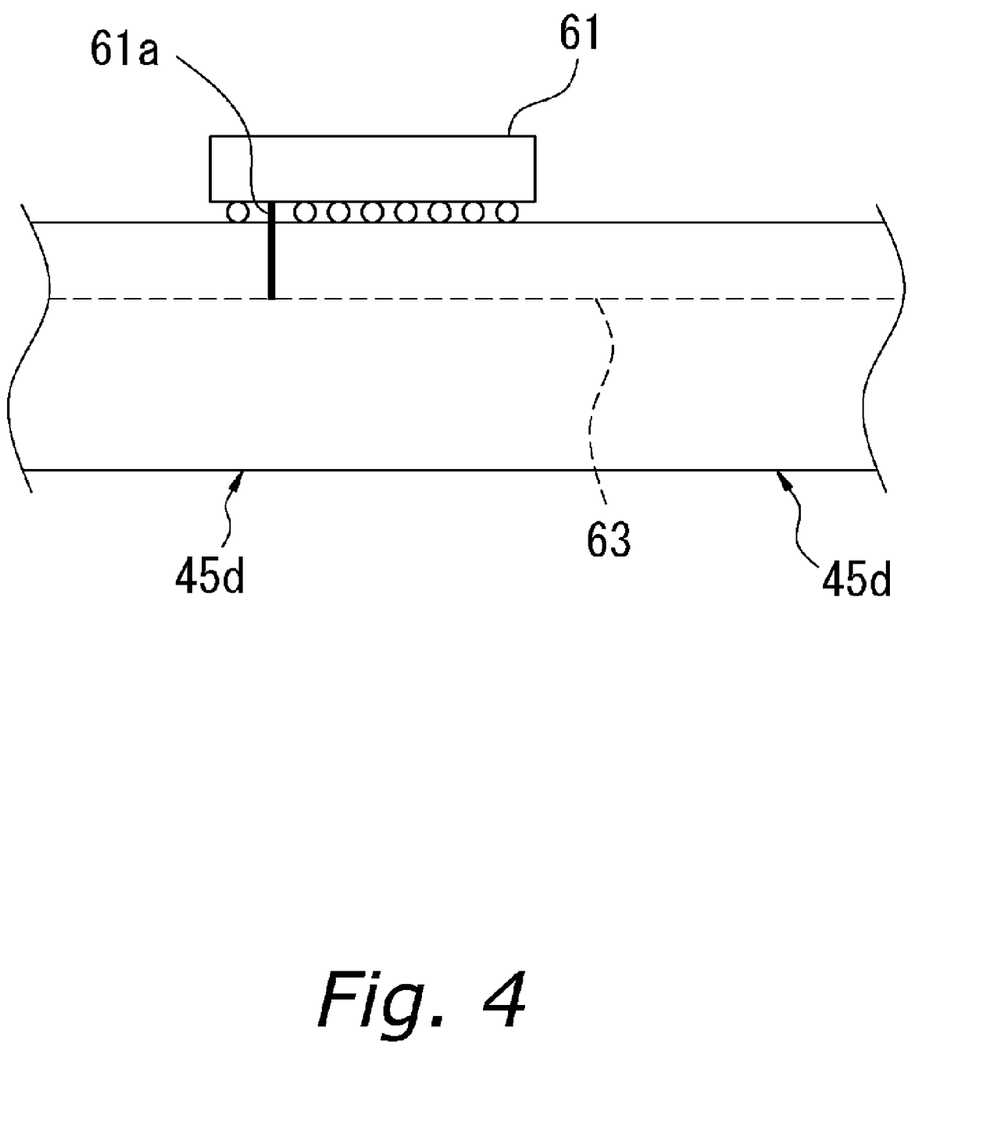
FIG. 4 is a vertical cross-section view schematically showing the major components of the device of FIG. 3.

The main circuit board 45d is for integrating and controlling the operation of the controller circuit boards 45a~45c and the power source unit 59, and specifically comprises either a four layer or a six layer multilayer circuit board. As shown in FIG. 4, the main circuit board 45d has a plurality of circuit layers which include a GND layer and the power source layer 63. This main circuit board 45d has a BGA type IC 61 mounted thereon. The IC 61 has a plurality of general ports which includes a model identification port 61a. With this embodiment, the model identification port 61a is connected to the power source layer 63 when in a high level. Therefore, the CPU of the main circuit board 45d will identify the model and determine that the device 41 is a predetermined model (for instance a 30 sheet model) by detecting that the model identification port 61a of the IC 61 is in the high level at the time of start up.

With an image forming device 41 with this construction, model identification is made by determining whether the model identification port 61a of the BGA type IC 61 is at a high level or a low level, but once the BGA type IC 61 has been removed from the circuit board, reattaching in the same connection state prior to removal is extremely difficult, so changing the connection status of the model identification port 61a will be essentially impossible. Therefore, other parties can be prevented from easily changing the level of the model identification, and thereby the occurrence of unanticipated problems or the like can be suppressed.

Fourth Embodiment

The description of the fourth embodiment will focus on the major differences to the third embodiment.

Figure 5:
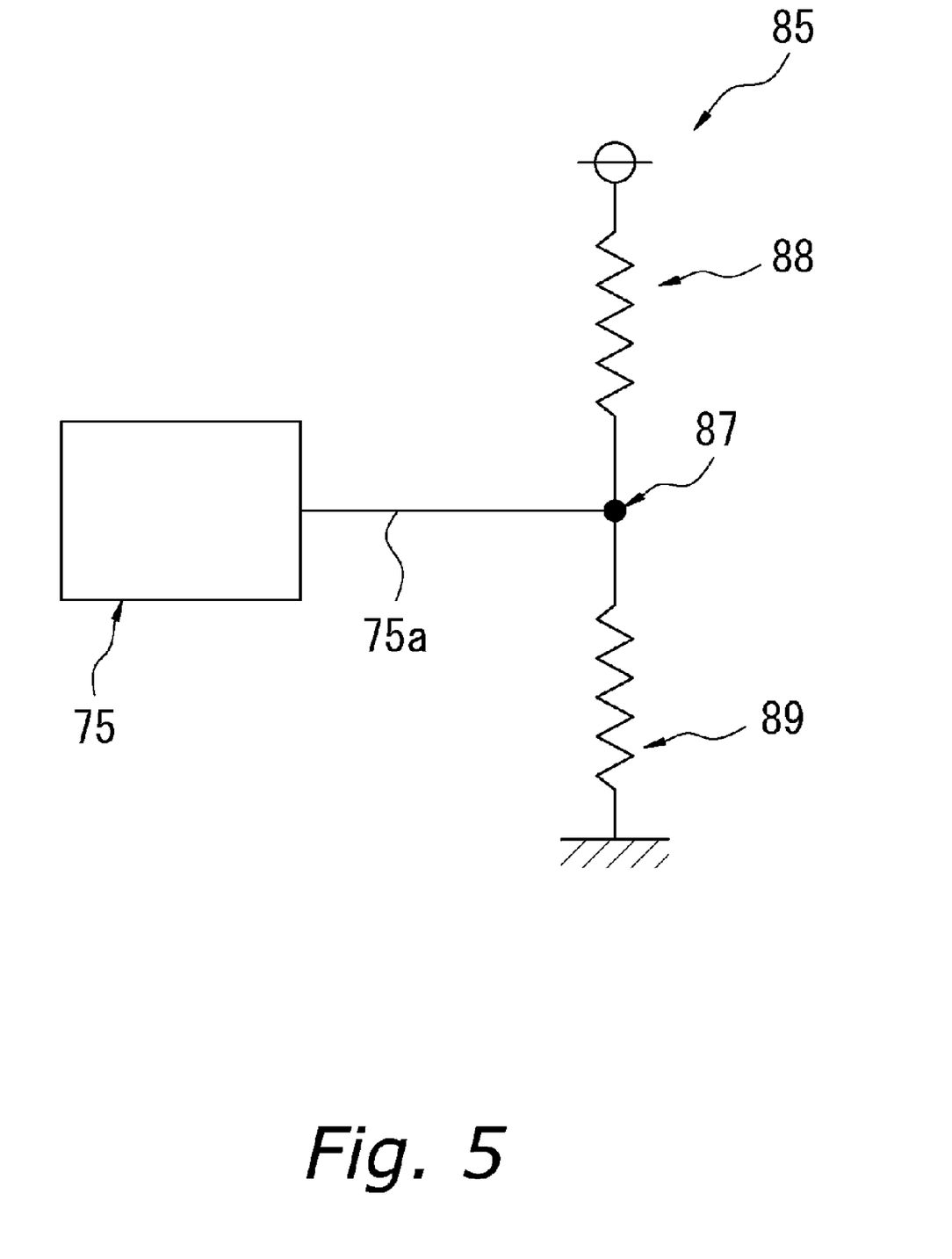
FIG. 5 is a circuit diagram showing the major components of an image forming device which uses a fourth embodiment of the present invention.

With this image forming device, the main circuit board comprises an IC 75, a resistor circuit 85, and the like as shown in FIG. 5. The IC 75 has an analog port 75a. The resistor circuit 85 has a connection point 87 which is connected to the analog port 75a, a first chip resistor 88, and a second chip resistor 89. These chip resistors 88, 89 preferably have a 1005 size or a 0603 size.

Furthermore, upon start up, the CPU of the main circuit board measures the voltage change input to the analog port 75a of the IC 75 from the split voltage ratio of the two resistors 88, 89.

With an image forming device of this construction, the change in the voltage input to the analog port 75a of the IC 75 by the split voltage ratio of the two resistors can be used to identify the model. However, because chip resistors 88, 89 are used as the two resistors, the resistance of the resistors cannot easily be determined by a third-party, so modifications will be difficult, and the occurrence of unanticipated problems or the like can be suppressed.

Fifth Embodiment

The description of the fifth embodiment will focus on the major differences to the third and fourth embodiments.

Figure 6:
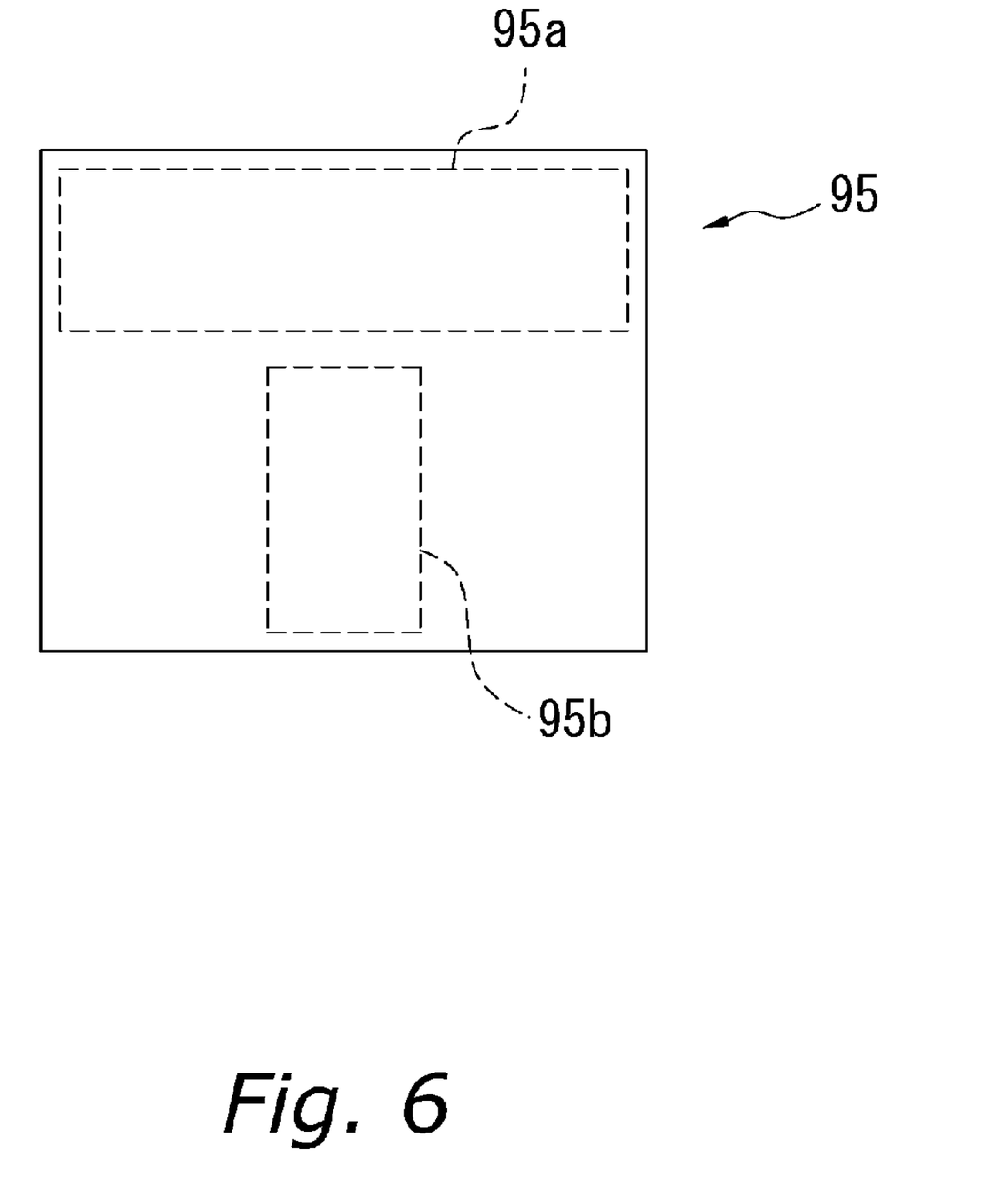
FIG. 6 is a plan view showing the major components of an image forming device which uses a fifth embodiment of the present invention.

With this image forming device, the main circuit board comprises a mask CPU 95 as shown in FIG. 6. The mask CPU 95 has a program memory unit 95a and an operation and control region 95b (model identification controller) and the like wherein data cannot be changed (is masked) after burning in during manufacture. A common program similar to that stored in the memory of the main circuit board 45d of the third embodiment and the model dependent data are stored in this program memory unit 95a. Note, the mask CPU is designed for different models depending on the number of pages per unit time data in the model dependent data.

Upon start up, the mask CPU 95 reads the model dependent data which is stored in the program memory unit 95a, and identifies the predetermined model of this device.

With an image forming device of this construction, the model dependent data is stored in the mask program memory unit 95a of the mask CPU 95, so modifications by a third party are not possible. Therefore, other parties can be prevented from easily modifying the model dependent data, and thereby the occurrence of unanticipated problems or the like can be prevented.

Modifications to the Third to Fifth Embodiments (a) With the third embodiment, the plurality of control circuit boards, which include the main circuit board and control circuit boards other than the main circuit board, may be constructed as multilayer circuit boards, and in this case, the BGA type IC is contained in the multilayer circuit boards, and the CPU of the circuit boards may be constructed to be able to identify the model.

Figure 7:
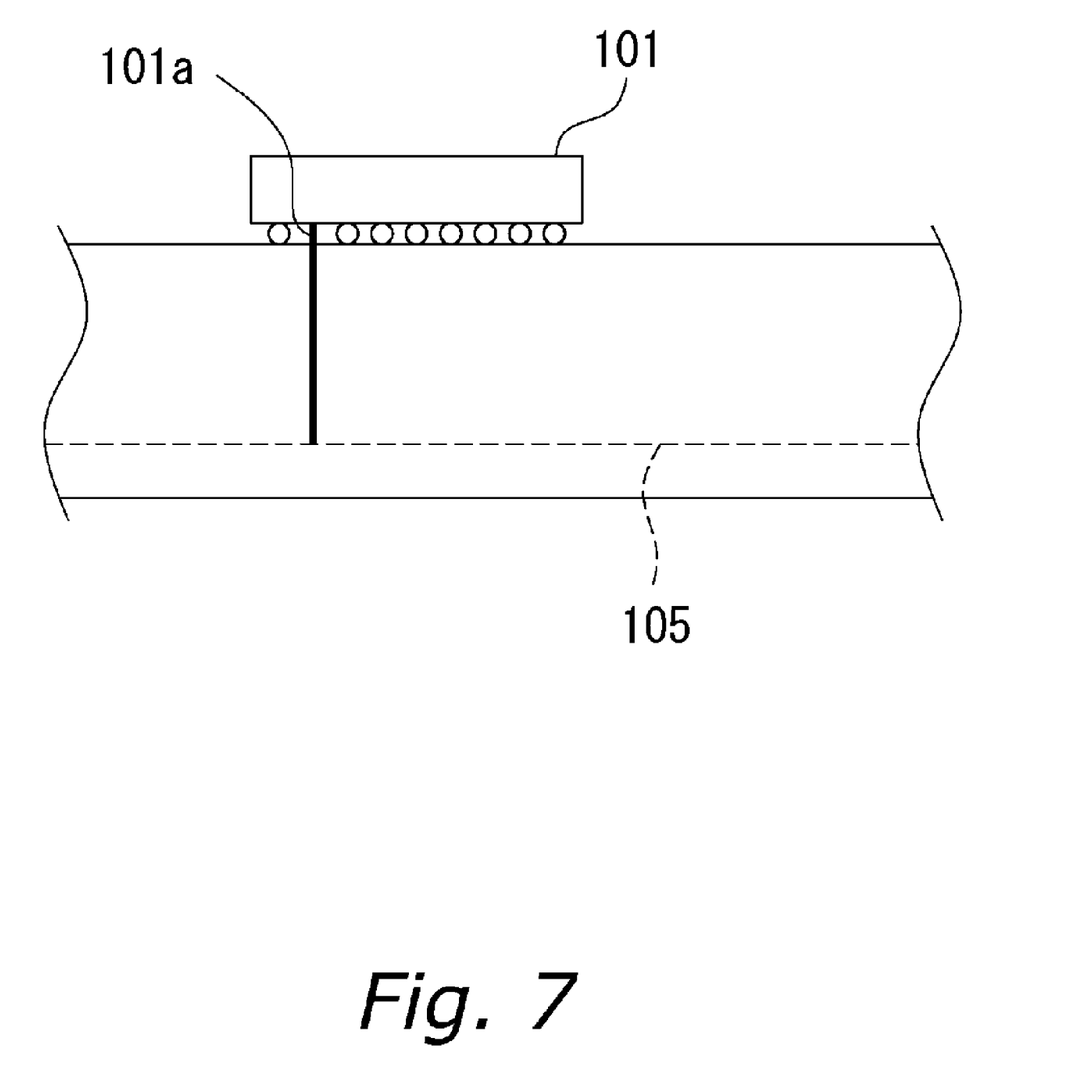
FIG. 7 is a vertical cross-section view schematically showing another form of the major components of the device of FIG. 3.

(b) With the third embodiment, as shown in FIG. 7, the model identification port 101a of the IC 101 may be able to determine that the model is different than the case of FIG. 4 (for instance, is a 40 page model) by being connected to the GND layer 105 at a low level. Furthermore, there may be a plurality of model identification ports, and in this case, a plurality of models can be identified by the pattern of the combinations of which of the plurality of model identification ports are at a high level or at a low level.

(c) With the fourth embodiment, it is not necessary for either of the two resistors to have a 1005 size and it is acceptable if at least one of the resistors has a size of 1005 or smaller.

(d) With the fourth embodiment, the mask CPU may be contained on a plurality of circuit boards which include the main circuit board or on circuit boards other than the main circuit board, and the model can be identified by these mask CPUs.

(e) With the fifth embodiment, model identification does not need to be performed in the same mask CPU, and another electronic device such as a CPU other than the mask CPU, an ASIC, or the like may be attached and thereby the mask identification function may be performed.

(f) In the third through fifth embodiments, the image forming device may be constructed such that a change in the connection status of the BGA type IC or the multilayer circuit board or a change to the chip resistance of the resistors circuit or the like is detected and notification made thereof. Therefore, in the event that a change to the level relating to model identification is made, a prompt response will be possible.

(g) The present invention is not restricted to image forming devices, and may be applicable to other electronic devices which have a plurality of hardware which is controlled in accordance with a control program.

Sixth Embodiment

Model Identification Circuit Board

Figure 8:
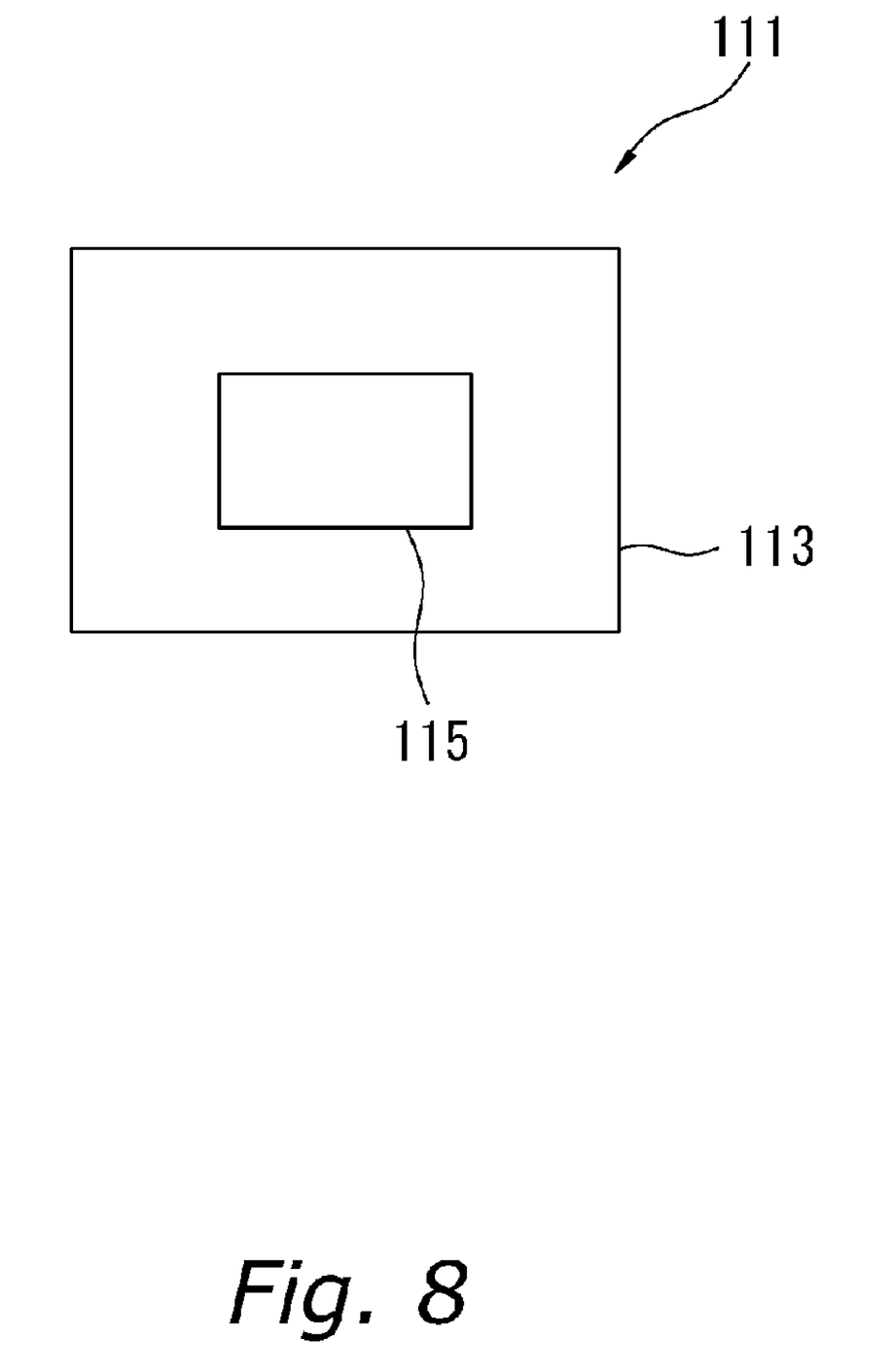
FIG. 8 is a diagram schematically showing a data storage medium which is used by a sixth embodiment of the present invention.

FIG. 8 shows a model identification circuit board (data storage medium) 111 which uses the sixth embodiment of the present invention.

This model identification circuit board 111 comprises a circuit board body (medium body) 113 and a memory unit 115.

The circuit board body 113 is for accommodating the memory unit 115, and has an attach terminal (not shown in drawing) which can be inserted to a slot 141 in an image forming device 121 which will be described later.

The memory unit 115 comprises a semiconductor memory which is on the circuit board body 113, and stores model information to be provided to the image forming device 121. This semiconductor memory may specifically be an EEPROM, a flash memory, or the like. Furthermore, the model information is unique to the model of the image forming device, and specifically includes page count data, and other related control conditions for the input/output units (described later) of the image forming device (paper transport speed, charge potential, interval between paper) or the like. Note that the model information which is stored in this memory unit 115 is for a higher-level model than the model information which is already stored in the recipient image forming device 121.

Furthermore, the model information which is stored in the memory unit 115 will be locked and subsequently become unreadable after once being provided to the image forming device 121. Specifically, when the model information is read by the image forming device 121, a lock signal output from the image forming device 121 is received and the address information of the model information is set to 0, so that subsequent reading by an external device will be essentially impossible.

Seventh Embodiment

Figure 9:
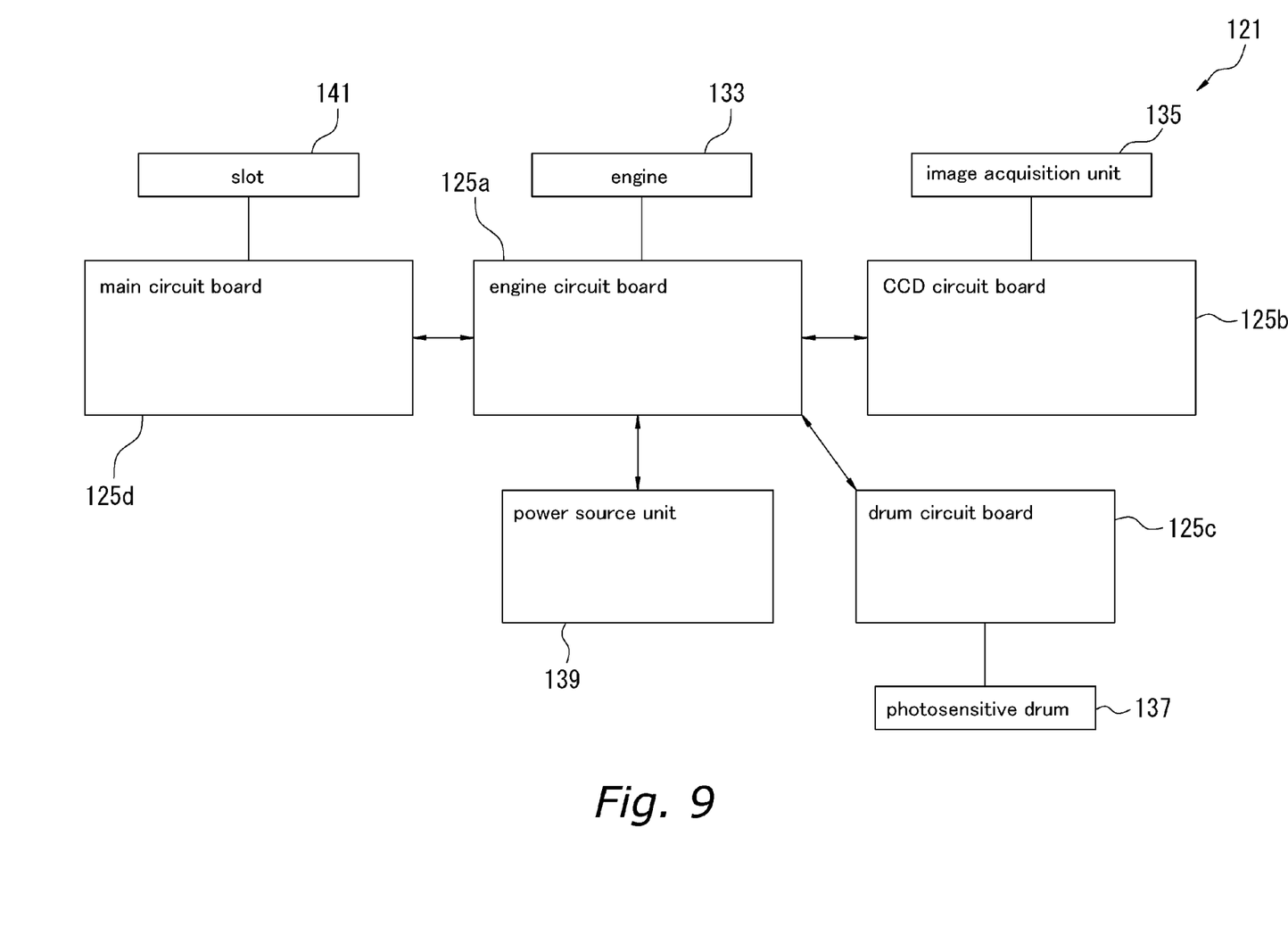
FIG. 9 is a block diagram schematically showing an image forming device which uses a seventh embodiment of the present invention.

FIG. 9 shows an image forming device 121 which uses the seventh embodiment of the present invention.

This image forming device 121 is a compound device which functions as a copier, printer, fax machine, and scanner, and comprises a plurality of input/output units (hardware) and four control circuit boards (information read controller, model identification controller, hardware controllers) 125a, 125b, 125c, 125d.

Each input/output unit is used in common for a plurality of models, and operate in accordance with a control program (discussed below), and operate together as a predetermined model of the image forming device 121 in accordance with model information. The input/output units comprise an engine 133, an image acquisition unit 135, a photosensitive drum 137, a power supply unit 139, a slot 141, or the like.

The engine 133 comprises a paper supply unit (not shown in the drawings), a transport mechanism, an image forming unit, a control panel, and the like. The paper supply unit is for supplying paper from either a paper supply cassette or a manual insert tray. The transport mechanism transports the paper supplied to the image forming unit and further downstream thereof. The image forming unit comprises a charging unit, an exposure unit, a developing unit, a transfer unit, or the like located near the photosensitive drum 137, and a fixinunit located downstream from the photosensitive drum 137. g The control panel comprises a plurality of operating keys and a display unit.

The image acquisition device 135 is for reading the image information for an original document on the document platen (not shown in the drawings), and comprises a CCD and an optical system (not shown in the drawings).

The photosensitive drum 137 is a cylindrical rotating body on which a toner image is formed on the surface thereof.

The power source unit 139 is for acquiring power from an external source, and is connected to the engine circuit board 125a.

The slot 141 functions as an input/output interface for the main circuit board 125d and the model identification circuit board 111, and is constructed so as to be able to attach to the attach terminal of the model identification circuit board 111.

The control circuit boards 125a~125d are specifically an engine circuit board 125a, a CCD circuit board 125b connected thereto, a drum circuit board 125c, and a main circuit board 125d, and electronic components (not shown in the drawings) such as a CPU, memory unit, and IC or the like are set thereon.

Each of the memory units on each of the circuit boards 125a~125d comprise RAM and ROM, and store a common program which is held in common in each circuit board 125a~125d. The common program is a program which is used in common by image forming devices which contain input/output units which are common between different models, and includes a plurality of control programs which are unique for each model and serve to control the operation of the input/output units.

The CPUs of the circuit boards 125a~125c select, read, and execute the control program for the model identified by the main circuit board 125d from the plurality of control programs which are included in the common program in the memory of the same circuit board.

The main circuit board 125d is a circuit board for integrating and controlling the function of the circuit boards 125a~125c and the power source unit 139. The main circuit board 125d will begin to read and install the model information in the memory 115 to the memory of the same circuit board 125d when the model identification circuit board 111 is inserted into the slot 141. Furthermore, when reading and installation of the model information is completed, a lock signal to prevent subsequent reading of the model information is generated and output to the model identification circuit board 111 so that the address of the model information will be set to 0. Therefore, the device 121 will be modified to a new model which reflects the content of the model information, and will be recognized as the modified model upon each subsequent startup.

Method for Upgrading Image Forming Devices Using a Model Identification Circuit Board Next, a method to upgrade an image forming device 121 which uses a model identification circuit board 111 will be described. The case where a dealer only holds a 20 page model (model which can print 20 pages per minute) image forming device 121 in inventory will be described.

First, the dealer purchases a model identification circuit board 111 which has the model information for a 30 page model, and inserts the attach terminal into the slot 141 of the image forming device 121. The main circuit board 125d then begins to read and install the model information in the memory unit 115. Furthermore, the model information which is read replaces the model information for the 20 page model which was already stored in the memory of the same main circuit board 125d, and the control programs for each of the models which is stored in the memory of the other circuit boards 125a~125c are overwritten by content which reflects the new model information. After the model information has been installed in this manner, the main circuit board 125d generates a lock signal which is output to the model identification circuit board 111. Therefore, the memory unit 115 of the model identification circuit board 111 will be locked, and subsequent reading of the model information by an external device will not be possible. In this manner, a 20 page model of the image forming device 121 is upgraded to a 30 page model device.

Using the aforementioned model identification circuit board 111 and the image forming device 121, even though only possessing one model, an authorized user or the like of the device 121 can easily modify that model to a different model based on a model identification circuit board 111 purchased in the market, for devices which have a plurality of models which contain common input/output units. Therefore, the dealer or the like will not need to hold multiple models of the device in inventory.

Modifications to the Sixth and Seventh Embodiments (a) Reading of the model information from the data storage medium is not restricted to forms where a circuit board like that of the sixth and seventh embodiments is inserted into a slot. For instance, other forms are possible, such as where an image forming device, computer terminal, and data server are connected to a LAN, the computer terminal is constructed to be able to read model information, the model information which is read by the computer terminal is uploaded to a data server, and the model information is downloaded from the data server to the image forming device and installed.

(b) The data storage medium is not restricted to circuit boards which contain semiconductor memory as described above, and other standard types of memory media such as floppy (registered trade name) disks, CD-ROM, and DVD-ROM or the like are acceptable. In this case, the image forming device or the like must have a reading unit to magnetically or optically read the memory media.

(c) With the sixth and seventh embodiments, the reading and identification of the model information was described as being performed only by the main circuit board 125d, but a construction where this function is performed by the other circuit boards 125a~125c in place of the main circuit board 125d or together with the main circuit board 125d is also acceptable.

(d) The electronic device of the present invention is not restricted to image forming devices, and may be applied to other electronic devices having a plurality of models and which have hardware which can operate as a predetermined model in accordance with model information which is unique to that model.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. An electronic device, comprising:

a plurality of mutually different models;

a plurality of hardware being configured to operate in accordance with a control program, the plurality of hardware collectively operating as a predetermined model of the electronic device in accordance with model dependent data, the model dependent data differing for each model of the electronic device from the plurality of mutually different models;

a plurality of memory units storing the control program and a boot program, the boot program being executed upon startup and including the model dependent data, the plurality of memory units being configured to store one or more control programs for the plurality of mutually different models of the electronic device;

a model identification controller being configured to read the model dependent data and identifying one model of the electronic device from the plurality of mutually different models;

a plurality of hardware controllers controlling the plurality of hardware as the model of the electronic device identified by the model identification controller in accordance with the control program, the plurality of hardware controllers being configured to select and to read the control program for the model of the electronic device identified by the model identification controller; and a model selecting unit being configured to select the one model from the plurality of mutually different models, the model selecting unit selecting a first model from the plurality of mutually different models when the electronic device is manufactured, and being configured to be changed by a user to select a different model from the first model, the plurality of hardware controllers executing the control program for a model if the model identified by the model identification controller and the model selected by the model selecting unit match, and the plurality of hardware controllers executing the control program for the lowest level model if the model identified by the model identification controller and the model selected by the model selecting unit do not match.

2. The electronic device according to claim 1, wherein the plurality of hardware includes an image forming unit which creates images on transfer media.

* * * * *